(No Model.) 2 Sheets—Sheet 1.
C. W. SALADEE.
VEHICLE.
No. 345,179. Patented July 6, 1886.
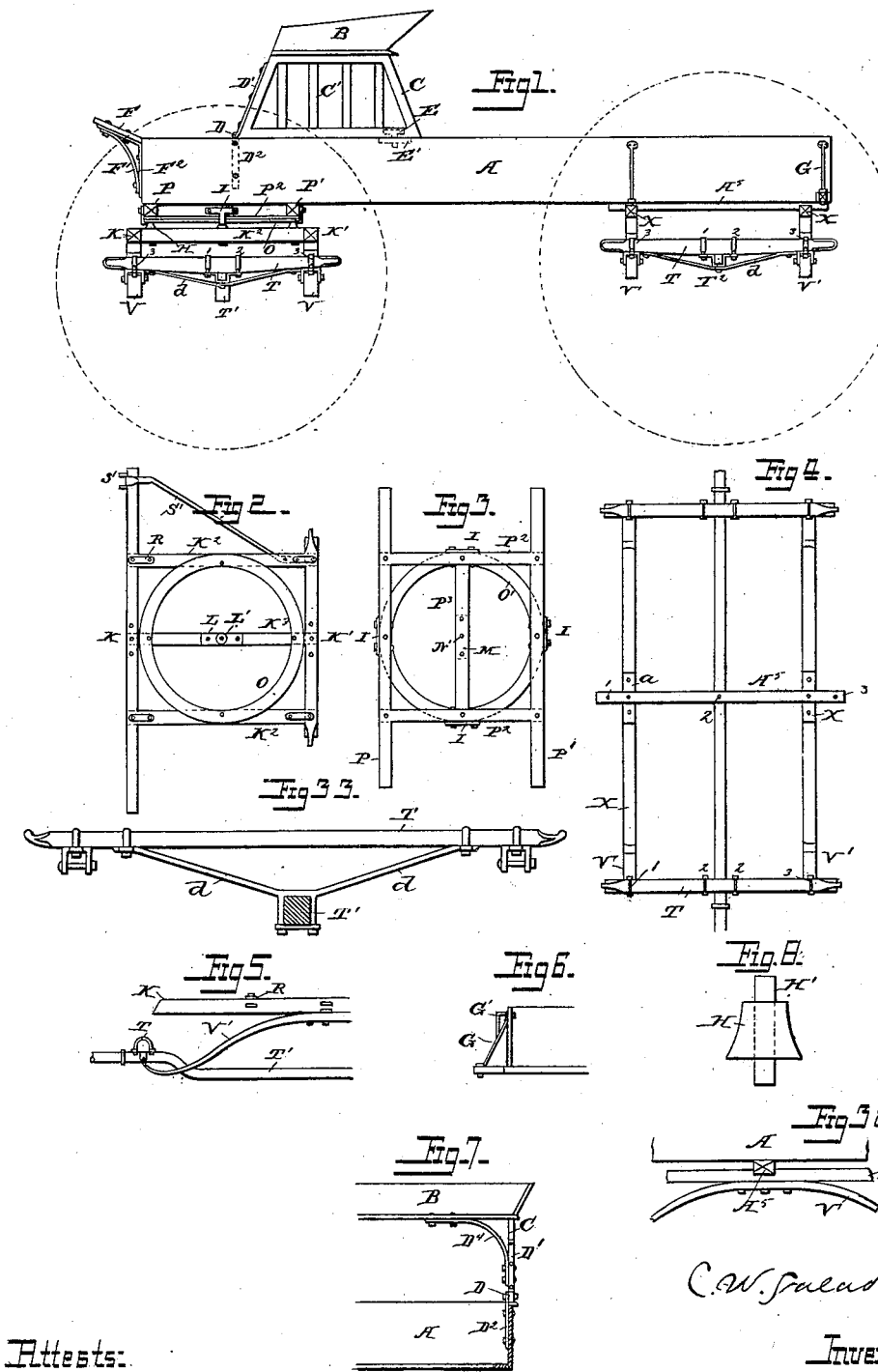

(No Model.) 2 Sheets—Sheet 2.

C. W. SALADEE.
VEHICLE.

No. 345,179. Patented July 6, 1886.

UNITED STATES PATENT OFFICE.

CYRUS W. SALADEE, OF BIRMINGHAM, CONNECTICUT.

VEHICLE.

SPECIFICATION forming part of Letters Patent No. 345,179, dated July 6, 1886.

Application filed January 20, 1886. Serial No. 189,197. (No model.)

*To all whom it may concern:*

Be it known that I, CYRUS W. SALADEE, of Birmingham, New Haven county, Connecticut, have invented certain Improvements in Vehicles, of which the following is the specification.

This invention relates to spring-platform wagons, the running-gear of which may be constructed with or without a reach; and it consists in the improved means of constructing and combining the several parts entering into its construction, as hereinafter more fully described.

The invention is fully illustrated in the annexed drawings, wherein Figure 1 is a side elevation of the vehicle. Fig. 2 is a detached plan view of the frame on which is supported the lower fifth-wheel circle over the front springs. Fig. 3 is a plan view of the upper circle of the fifth-wheel, on which is supported the frame carrying the front end of the body. Fig. 4 is a detached plan view of the rear platform seen in Fig. 1. Fig. 5 is a detached front elevation of the front axle, showing the frame in Fig. 2 in position on the spring. Fig. 6 is a detached rear view of the body shown in Fig. 1. Fig. 7 is a detached front elevation of the body and seat. Fig. 8 is a detached and enlarged side view representing one of the spools supporting the fifth-wheel upon the frame, as shown in Figs. 1 and 2. Fig. 9 is a detached side elevation of the upper half of the fifth-wheel and king-bolt center; and Fig. 10 is a like view of the lower half of said center coupling, through which the king-bolt is passed, as shown in Fig. 30. Figs. 11 and 12 are plan views of Figs. 9 and 10. Fig. 13 is a front elevation of the safety-hook connecting the fifth-wheel circles, as shown in Fig. 1; and Fig. 14 is an edge view of the same. Figs. 15 and 16 are detached plan and edge views of the tenon-supporting plate shown by R, Fig. 2. Figs. 17 and 18 are front and edge views of the T-plate secured to the rear end of the seat-riser, as shown by dotted lines E in Fig. 1; and Figs. 19 and 20 are side and edge views of the loop into which the T-plate, Fig. 17, is held. Figs. 21, 22, and 23 are enlarged detached views of the parts composing the hinge D, shown in Fig. 1, connecting the seat to the front end of the body, and which is more clearly shown in Fig. 24. Fig. 25 is an enlarged side elevation of the bracket supporting the toe-board shown in Fig. 1, and Fig. 26 is a part front elevation of Fig. 25. Fig. 27 is an enlarged and detached side elevation of the tail-board brace G, shown in Figs. 1 and 6; and Fig. 28 is an edge view of same. Fig. 29 is the king-bolt plate, an edge view of which is shown in Fig. 30. Fig. 30 is a detached and enlarged side elevation of a part of the center bar, $K^3$, shown in Fig. 2, with the fifth-wheel center coupling in position thereon, and showing the cross-bar $P^3$ of the upper frame, Fig. 3, in section; and Fig. 31 is a plan view of the king-bolt plate secured to the top of the bar $P^3$, Fig. 3. Fig. 32 is a front or rear elevation of one of the springs and spring-bars of the rear platform. Fig. 33 is a side view of a modified form of spring-platform.

In carrying out my invention, reference being had to the drawings, A denotes the body, Fig. 1; B, the seat; C, the seat-riser interposed between the side of the body and seat, said seat-riser C being composed of a frame, as shown, the open space of which is braced by either the interposition of the vertically-arranged slats C', or an inserted solid panel, which not only serves to support the frame and seat, but imparts to the riser a finished and ornamental appearance.

D is the hinge connecting the front lower corner of the seat-riser C to the side of the body, whereby to admit of raising the rear end of the seat up out of the way for convenience in loading and unloading the wagon, meantime permitting the front edge of the seat to rest on the toe-board F. This hinge D is of peculiar construction, as may be more clearly seen by reference to Figs. 21, 22, 23, 24. The lower arm, $D^2$, of the hinge is secured to the side of the body. The top end of the lower arm terminates in a boss, $D^3$, (see Figs. 21 and 24,) preferably of a cone or bevel shape, and which is fitted in a corresponding recess in the lower end of the upper arm, D', and a bolt or rivet secures the two parts of the hinge, as shown in Fig. 24.

E is the T-plate secured to the rear lower corner of the seat-riser C, as shown in dotted lines, Fig. 1, a detached and enlarged side and edge view of which is shown in Figs. 17 and 18. Said T-plate engages a loop, E', Fig. 20, secured to the inside upper edge of the body.

The toe-board F is secured to the top edge of the body-front, and is there supported by the bracket F' F², Figs. 25 and 26. On the inside angle-plate, F², are the laterally-extended ears F³, whereby to screw or bolt same to the body and toe-board. The opposite ends of this inside plate, F², are supported by the diagonally-arranged brace F', preferably integral with the plate F², thereby securing a light, strong, and ornamental support for the toe-board. To the rear end of the body, in all cases when a tail-board or end-gate is used and carried upon hinges in the usual way, I attach the peculiarly-constructed brace G, having the angle-loop G' made integral with said brace, the object of which latter is twofold: first, to serve as a loop or ring to receive the end of the strap or chain which is generally employed to support the tail-board in any required position, and, second, as a loop or ring through which to pass a line or rope to secure the load in the body when circumstances require the same.

The platform supporting the front end of the body is constructed substantially as follows: T' represents the axle, (see Figs. 1 and 5,) which in this instance is a cranked axle, side bars, T, (or, when preferred, a flexion spring may be substituted for the rigid bar,) preferably made of wood, having their center portion rigidly and securely connected in a transverse position to the axle near the shoulders thereof in any manner that will leave the opposite ends of the bars suspended free of all other contact than with the terminal eyes of the springs V V, which latter are pivotally connected to the ends of the bars by shackles, preferably without links. The springs are of the self-compensating form, as shown in Fig. 5, preferably of the form shown in my Patent No. 305,850, and are arranged parallel with and on opposite sides of the axle. The ends of the side bars being suspended free of other contact than with the terminal eyes of the springs, they are permitted to spring or vibrate laterally to that limited degree requisite to any slight elongation or contraction of the springs when actuated beyond their self-compensating points, and thus links may be omitted in their pivotal connection with the side bars. The duplex springs are mounted by a frame consisting of bars K K' K² K² K³, adapted to support the fifth-wheel circles. This frame is clearly shown in the detached plan view, Fig. 2, wherein K is the front or draft bar; K', the rear bar; and K², K², and K³, the transverse bars connecting the lateral bars K K'. The center portions of the draft and rear bars of the frame are rigidly clipped or bolted to the top center portion of the duplex springs, as shown in Fig. 5. It will now be seen by reference to Fig. 5 that the peculiar form of the spring next its contact-point with the bar or frame is such that as the load is increased and the spring depressed its bearing on the under side of the bar is automatically adjusted along the bar in the direction of V', thus adapting the springs to an easy motion whether under a light or heavy load—a novel and valuable feature in transverse duplex springs. The lower circle, O, of the fifth-wheel is supported upon the frame, Fig. 2, upon four spools, H, Fig. 8 being a detached and enlarged view of one of said spools. A bolt passes through the circle, spool, and frame at the four points indicated in Fig. 2. The top circle, O', Fig. 3, supports the frame carrying the front end of the body, as clearly shown in Figs. 1 and 3. The center or king-bolt coupling-connection of the two circles to a common center is shown in the detached views, Figs. 9, 10, 11, 12, and 30. The upper plate, M, (see Fig. 9,) is provided with a central boss, N, the lower end of which terminates in a cone, N', or is tapered and fitted into a corresponding opening in the boss L' of the lower plate, L. The upper plate is secured to the under side of the center bar, P³, of the upper frame, Fig. 3, and the lower plate to the top side of the center bar, K³, of the lower frame, and the parts are brought together, as shown in Fig. 30, wherein is shown the king-bolt L², uniting the upper and lower frames. The junctions of the cross-bars of the frames, Figs. 2 and 3, with the front and rear bars, K and K', are effected by tenons and mortises, and this is strengthened by the tenon-plates R, as shown in Fig. 2, a detached and enlarged view of which is shown in Fig. 15. To the opposite ends of the extended front bar, K, of the frame in Fig. 2 are secured the shaft or pole shackles S, and the suspended ends of this bar are firmly braced by means of the diagonally-arranged stays S', extended from the ends of the bar to the opposite side of the frame, as clearly shown in Fig. 2. The rear platform, Fig. 4, so far as the axle, springs, and side bars are concerned, is a duplicate of the front one. Spring-bars X X (see Fig. 1) are interposed between the body and springs and securely connecting the rear end of the body thereon. The center bolt, a, of the springs secures the longitudinal brace A⁵ in its depressed or recessed position in top surface of the bar, and the center portion of the body is bolted to the brace A⁵ at holes 1, 2, and 3, the ends extending beyond the bars far enough to admit of bolting these extended ends to the body. The outer edges of the two fifth-wheel circles are held together and prevented from separating by the application of the safety-hooks I, Figs. 1, 13, and 14. The top or T part of the hook is bolted to the outside surface of the frame, as shown in Figs. 1 and 3, and the hook end J passes down and around both edges of the fifth-wheel circles, thereby holding both together, yet allowing the one to turn around upon the other, and at the same time affording a perfect security against accident should the king-bolt coupling be broken. If preferred, these hook-plates may be reversed—that is, they may attach to the lower frame, Fig. 3, and the hooks grasp the top circle; but I prefer the position shown and described. Under braces, d, serve to brace both the front and rear platforms. Each brace is bolted or clipped at its ends to opposite ends of each side bar, as shown in Fig. 1, and its depressed central portion is bolted or clipped, preferably, to the under side of the axle, thereby imparting great stiffness and rigidity while using light side bars.

I will here add that in carrying out my invention I prefer the construction of the running-gear without reach, as seen in Fig. 1; but I desire to have it clearly understood that in all cases when for any reason a reach connecting the axles is preferred, I intend to employ it, which may be done in any of the well-known methods of applying the same. Furthermore, the peculiar construction and arrangement of the rear platform (shown in Figs. 1 and 4) is not limited in its application to the special class of wagons shown in the drawings, since it is equally applicable to many other classes of vehicles, and especially well adapted to road-carts or two-wheeled vehicles, and I so intend to employ the same; also, while my preference is for the use of the duplex springs described without a link-connection interposed between their terminal eyes and the suspended ends of the side bars, yet if a perch or reach is employed connecting the axles links may be used, in which case I purpose to adopt the same.

In some cases of wagons it may be necessary to carry the side bars elevated above the axle, in which case they are supported upon brackets, the center portions of which are rigidly clipped or otherwise fixedly attached to the axle, and the outer ends in like manner rigidly secured to the opposite ends of the side bars, in the manner substantially as seen in Fig. 33.

I do not herein claim the construction and arrangement of the seat and body, as these features will be made the subject of a separate application for Letters Patent.

Without limiting my claims to the precise arrangement and construction of parts shown, I claim—

1. In a vehicle, the combination of the body having a fifth-wheel-supporting frame secured directly thereto, and a crank-axle, side bars supported upon and in a transverse position to the axle at or near the shoulders thereof, and self-compensating springs having their terminal eyes connected to pivotal bearings carried by the suspended ends of the side bars below the same, substantially as described.

2. The combination, with a vehicle-body having a fifth-wheel-supporting frame secured thereto, and an axle, of side bars connected by strap, loop, and clips in a transverse position to the axle, near the opposite shoulders thereof, said side bars having their middle portions rigidly secured to the axle, and their opposite ends suspended free from all contact, except with the terminal eyes of the flexion-springs carried thereby, substantially as described.

3. In a vehicle, a body, a fifth-wheel-supporting frame secured to said body, a crank-axle, springs having downwardly-curved middles and upwardly-curved ends, and arranged at each side of and parallel with said axle in planes respectively above and below bars that are secured transversely of said axle to support said springs, substantially as described.

4. The combination, in a vehicle, of the body, a fifth-wheel-supporting frame secured thereto, the crank-axle, side bars secured to said axle transversely thereof, rigid connections secured to and depending from said bars near the ends thereof, and springs having oppositely-curved middle and ends, said springs secured to said connections and extending parallel with said axle in planes respectively above and below said transverse bars, substantially as described.

5. The combination, with a vehicle-body having a fifth-wheel-supporting frame secured rigidly thereto, of a crank-axle, bars secured to said axle tranversely thereof, and springs supported by said bars in planes parallel with the axle and respectively above and below said bars, with a frame secured at opposite sides of said axle to said springs at the middles thereof, substantially as described.

6. In a vehicle, the combination, with the vehicle-body having the upper fifth-wheel frame secured thereto, the axle, side bars, and a frame adapted to carry the lower fifth-wheel circle, of a duplex-spring support consisting of parallel similar sections having each a straight horizontal middle portion rigidly secured to the under side of the transverse middle portion of the frame on opposite sides of the axle, said springs being curved downwardly from their contact with the frame with such increasing curvature as will secure their automatic adjustment of their bearings along the bars of the frame according to the weight imposed, substantially as set forth.

7. In a rod-wagon, the combination, with the fifth-wheel frame, the upper of which is secured to the wagon-body, and center bars, of the center coupling, L M, and fifth-wheel circles O O', substantially as and for the purpose set forth.

8. The combination of the shaft-bar K, the fifth-wheel frames, one of which is secured to the vehicle-body, the shaft or pole shackle S, and the diagonally-arranged stay-brace S', with a rectangular frame formed by the bars K K' K², substantially as set forth.

9. In a road-wagon, the rear body-platform consisting of the axle, rigid side bars, T, flexion-springs V' V', and spring-bars X X, constructed substantially as herein set forth.

10. The combination, with the notched bars X X, of the rear frame of a center brace, A⁵, secured to the body, substantially as set forth.

11. In a road-wagon, the combination, with the side bars, T, and a duplex flexion-spring platform, part of which is secured to the wagon-body, of a cranked axle, substantially as described.

12. The combination, with the spring-platform frame having side bars and with the axle, of braces connected at the ends to the side bars, and provided at their centers with downwardly-projecting lugs connected to the under sides of the axle, substantially as described.

13. In combination with the duplex-spring platform having side bars, and with the axle, the side bars carried above the latter upon brackets which are connected at the ends to said side bars and depressed at the centers to form lugs that said brackets connect to the axle, substantially as described.

In testimony whereof I have signed my name to this specification in the presence of two subscribing witnesses.

CYRUS W. SALADEE.

Witnesses:
J. D. McMAHON,
A. E. T. HANSMANN.